United States Patent Office 3,068,847
Patented Dec. 18, 1962

3,068,847
INTERNAL COMBUSTION ENGINE EXHAUST VALVE ASSEMBLY AND METHOD OF ENGINE OPERATION
Joseph T. Wentworth, Royal Oak, Mich., assignor to General Motors Corporation, Detroit, Mich., a corporation of Delaware
Filed Aug. 10, 1960, Ser. No. 48,704
12 Claims. (Cl. 123—90)

The invention relates to exhaust valve assemblies and methods of engine operation used in internal combustion engines and particularly to assemblies and methods in which the exhaust gases pass from a central portion of the combustion chamber to the engine exhaust passages.

In recent years the emission of hydrocarbons by internal combustion engines, particularly those used in automotive vehicles, has been of great interest because of their possible connection with air pollution and especially the atmospheric condition commonly referred to as smog. Recent research has indicated that most of the hydrocarbons emitted by an internal combustion engine operating on the Otto cycle below about 21 inches of mercury intake manifold vacuum result from a phenomenon referred to as "wall quenching." As the flame spreads throughout the engine combustion chamber, the fuel is almost completely burned except within a zone immediately adjacent the combustion chamber wall. This zone may be only a few thousandths of an inch thick and is known as a "quench zone." Flame reaction in this quench zone is inhibited so that when the combustion portion of the cycle is completed the entire surface of the combustion chamber is coated with a thin layer of unburned or partially burned fuel. This unburned or partially burned fuel is exhausted during the exhaust cycle and constitutes most of the hydrocarbon emission through the exhaust system.

An exhaust valve assembly embodying the invention includes an exhaust valve encased in a movable sleeve which is projected into the combustion chamber during the exhaust cycle, and the control mechanism therefor. When the exhaust valve opens the exhaust port controlled by it is preferably located at the approximate center of volume of the combustion chamber. Since during the exhaust cycle the volume of the combustion chamber is decreasing in size due to the movement of the engine piston toward top dead center, it is preferable to have the exhaust valve sleeve move in such a manner as to maintain the exhaust port approximately at the center of the combustion chamber so that it is as far as possible from the chamber walls and therefore removed from any portion of the quench zone. In some instances the arrangement of other engine components in the combustion chamber and the turbulence created due to combustion chamber configuration may dictate certain modifications such that the exhaust opening is positioned at a point other than the center of volume of the combustion chamber. However, it should be as close to the immediate vicinity of the center of volume as feasible.

Ideally the exhaust valve will move with the exhaust valve sleeve so that the exhaust valve opening remains closed until the sleeve is positioned at the desirable point in the combustion chamber and the exhaust cycle is begun. The exhaust valve then moves relative to the sleeve to uncover the exhaust opening. The progressive movement of the engine piston during the exhaust cycle reduces the combustion chamber volume while forcing the exhaust gases through the exhaust opening. As the piston moves and the chamber volume is reduced, the exhaust valve and sleeve will be retracted in relation thereto so as to maintain the exhaust opening at a desirable position. The exhaust valve will retract relative to the sleeve toward the end of the exhaust cycle and close the exhaust port before any gases containing a high proportion of hydrocarbons are exhausted. The residual gases in the quench zone and containing most of the unburned fuel are then mixed with the incoming fuel-air charge for the next cycle and the unburned fuel recirculated within the engine.

The assembly now proposed preferably utilizes a linkage such that the sleeve movement does not affect the valve opening movement so that these two movements are essentially independent and can be adjusted by modifying the actuating cams.

Figure 1:
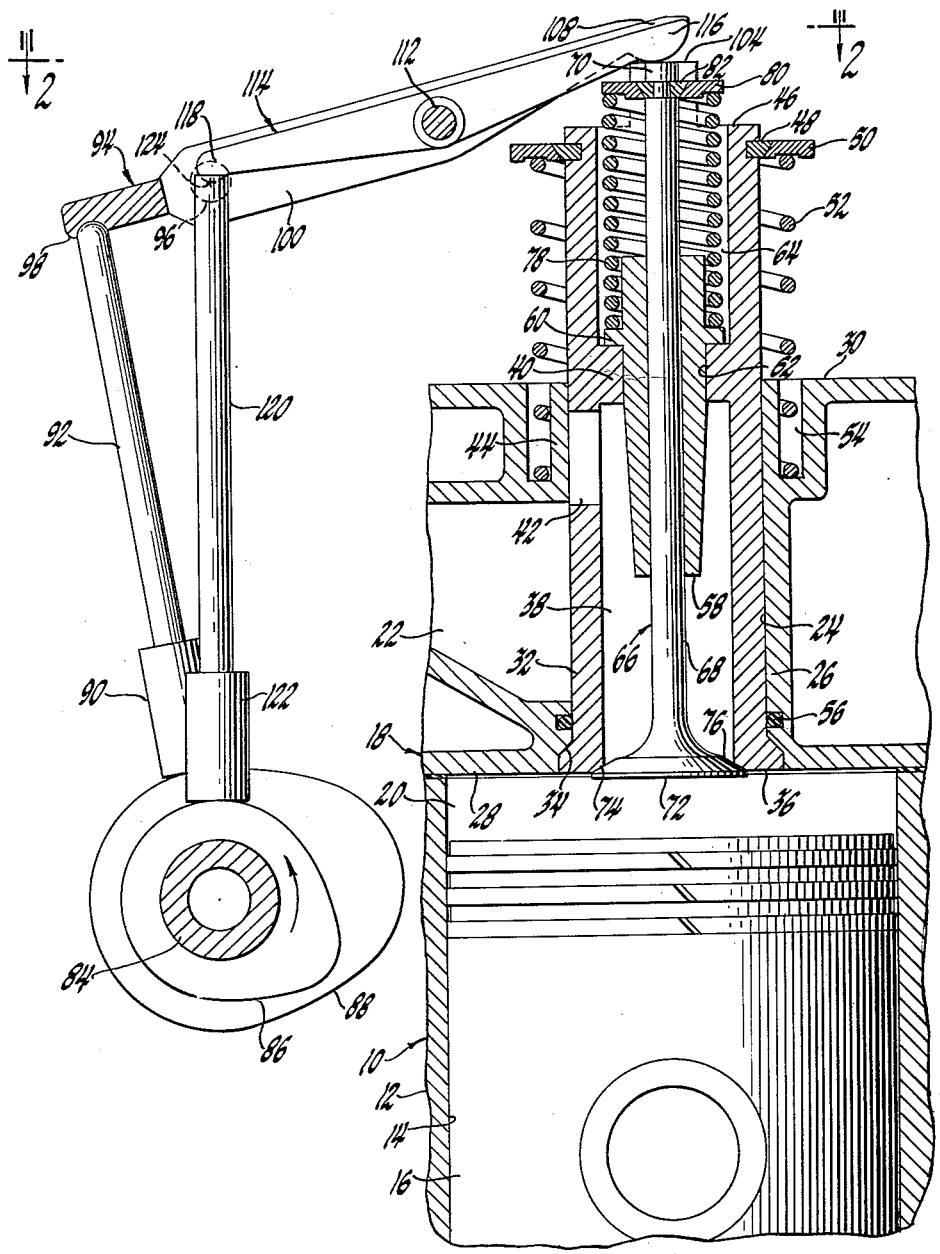
FIGURE 1 is a semi-schematic illustration of mechanism embodying the invention with parts broken away and in section, and illustrating the mechanism in position during the first part of a power stroke.

The internal combustion engine 10 has a cylinder block 12 in which cylinders 14 are provided. Pistons 16 are reciprocably received within cylinder 14, in cooperation with the cylinder heads 18 providing combustion chambers 20, one of which is shown in the drawings. Cylinder head 18 is provided with suitable exhaust passages 22, only one of which is shown. Each exhaust passage 22 provides a connection between the combustion chamber 20 and the engine exhaust system in order to conduct the products of combustion to the atmosphere from the engine. The inner end of each passage 22 terminates in a bore 24 which is cylindrically formed to provide a sleeve guide wall 26. Bore 24 preferably extends coaxially with cylinder 14 although in some instances it may be positioned off the cylinder axis in order to accommodate other engine mechanisms as well as to take advantage of the turbulent flow which may be obtained in the combustion chamber 20. Bore 24 extends through the cylinder head inner wall 28 and connects with the chamber 20. It also extends through the cylinder head outer wall 30. An exhaust valve seat sleeve 32 is reciprocably received within bore 24 so that it controls the access between combustion chamber 20 and exhaust passage 22. A sleeve seat 34 is formed in the cylinder head inner wall 28 and the enlarged sleeve head 36 may be seated thereon. The sleeve passage 38, which extends axially through the sleeve to a generally central area wherein the internal shoulders 40 is formed, acts as an exhaust passage through which exhaust gases pass from combustion chamber 20 to exhaust passage 22. The side of sleeve 32 exposed to exhaust passage 22 is provided with a port 42 which extends for some distance longitudinally of the sleeve. When the sleeve head 36 is seated on its seat 34, port 42 may register with the guide wall section 44 of cylinder head 18 so that little or no exhaust gases are able to pass through the port. The outer end 46 of sleeve 32 extends beyond head 18 and has a seat retaining ring 48 secured thereto which in turn receives spring seat 50. A sleeve return spring 52 seats against one side of spring seat 50 and within the spring seat recess 54 formed in the outer side of cylinder head outer wall 30 so as to urge sleeve 32 toward the position shown in FIGURE 1 wherein sleeve head 36 is seated against its seat 34. Seal 56 is provided to engage the outer wall of sleeve 32 and is positioned within a recess formed in the portion of sleeve guide wall 26 adjacent sleeve seat 34. Seal 56 thus seals against leakage around sleeve 32 from combustion chamber 20 to exhaust passage 22.

A valve stem guide 58 is provided with a flange 60 which is seated on shoulder 40 so that guide 58 extends into sleeve passage 38 through the passage 62 formed by shoulder 40. The other end of guide 58 on the opposite side of flange 60 extends into the spring recess 64 of sleeve 32. The engine exhaust valve 66 has its valve stem 68 extending through guide 58 with its outer end 70 extending through spring recess 64 and upwardly beyound the outer end 46 of sleeve 32. Valve head 72 mates with the valve seat 74 formed on the inner annulus of the sleeve head 36 so that the valve head is outwardly exposed to the combustion chamber 20. The exhaust opening 76 defined by valve head 72 and valve seat 74 is closed in the position of the mechanism illustrated in FIGURE 1. A valve return spring 78 is seated against flange 60 and spring seat 80 which is held to the valve stem end 70 by key 82. Spring 78 therefore urges valve head 72 into engagement with valve seat 74.

Figure 2:
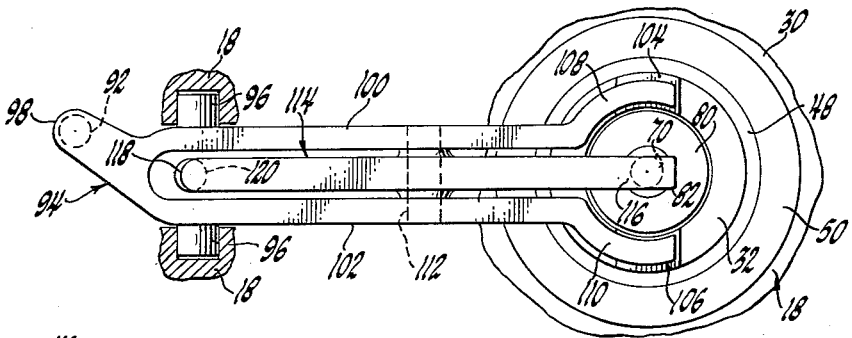
FIGURE 2 is a view of the mechanism of FIGURE 1 taken in the direction of arrows 2—2 of that figure illustrating the arrangement of a portion of the valve linkage and having parts broken away and in section.
Figure 3:
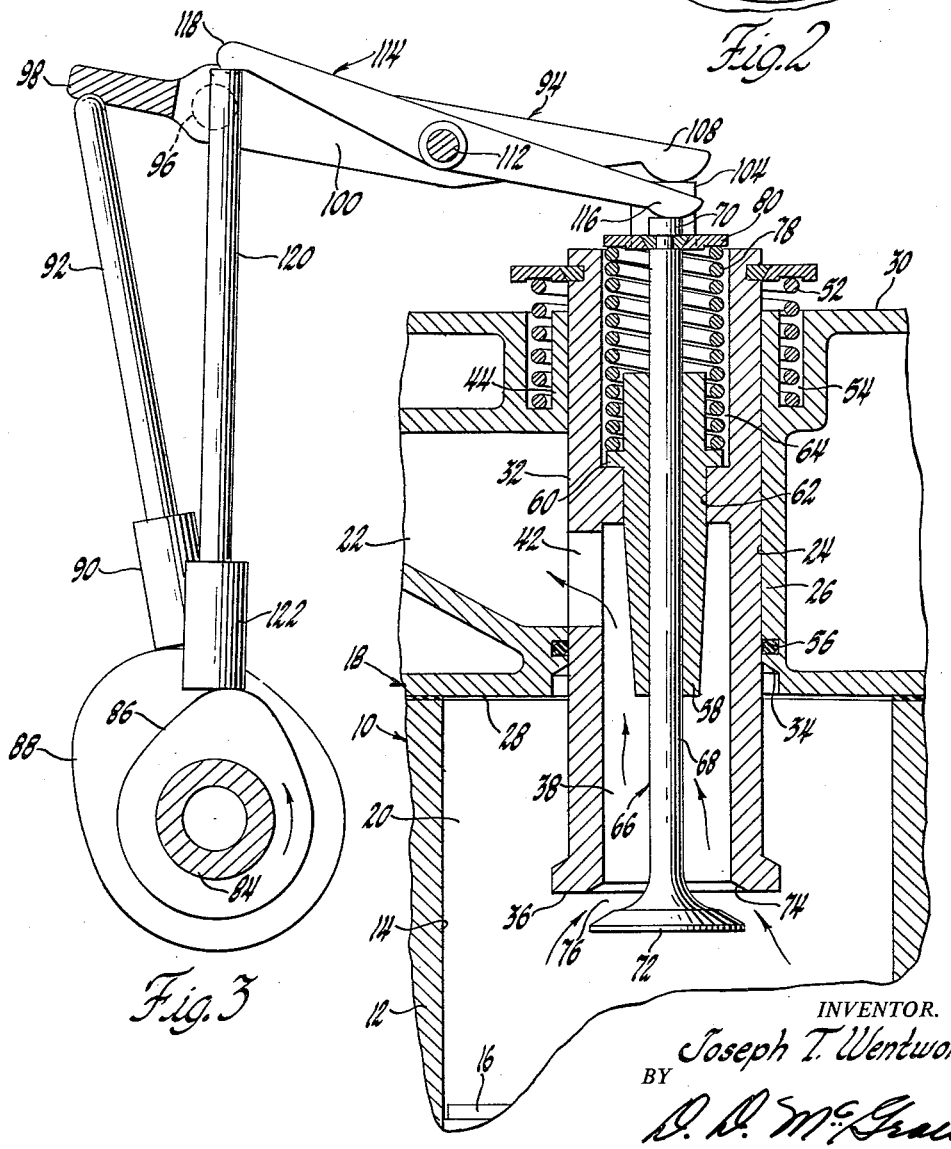
FIGURE 3 is a view similar to FIGURE 1 and showing the mechanism in position shortly after the beginning of the exhaust cycle.

The engine camshaft 84 may be suitably driven in timed relation with movement of the piston 16 in a manner well known in the art and is provided with exhaust valve cams 86 and exhaust sleeve cams 88. Each sleeve cam 88 is engaged by a valve lifter 90 which acts through push rod 92 to move the bifurcated sleeve rocker arm 94 about the rocker pivots or trunnions 96. Push rod 92 may engage the end 98 of rocker arm 94 for this purpose. The end 98 may be laterally offset from the remainder of the rocker arm to permit clearance between the push rods. This will normally be required since the cams 86 and 88 will be adjacent each other on the camshaft 84. As is best seen in FIGURE 2, rocker arm 94 has two generally parallel fingers 100 and 102 which extend from arm end 98 to a position over pads 104 and 106 which are provided on the outer end 46 of sleeve 32. The ends 108 and 110 of fingers 100 and 102 may be formed outwardly so as to clear the extended cylinder defined by spring recess 64 of sleeve 32. A rocker arm pin 112 is provided through fingers 100 and 102 at a point intermediate trunnions 96 and ends 108 and 110 to pivotally support the valve rocker arm 114. Rocker arm 114 is shorter than arm 94 and received intermediate fingers 100 and 102. Its end 116 engages valve stem end 70 and its end 118 engages push rod 120 which is actuated by exhaust valve cam 86 through valve lifter 122. Thus rocker arm 94 is pivoted relative to the cylinder head 18, or a suitable projection therefrom, in which trunnions 96 are journaled and valve rocker arm 114 is pivoted on rocker pin 112 which is supported by rocker arm 94. Independent sleeve and valve actuating movements of rocker arms 94 and 114 are obtained by having the contact point 124 of end 118 positioned on the axis of trunnions 96. Thus as arm 94 is moved by cam 88 about the axis of trunnions 96, pin 112 also moves arm 114 about this axis by virtue of the position of contact point 124. Thus no relative movement between arms 94 and 114 is attained as a result of the movement of arm 94. Similarly the contact points of ends 108 and 116 are positioned on a line normal to the common axis of valve 66 and sleeve 32. In normal operation a clearance of approximately .010 inch may be maintained between rocker arm end 116 and valve stem end 70 prior to the opening of the valve, even though the valve and sleeve assembly is moved downwardly under the influence of cam 88.

During the power stroke, cam 88 acts through the associated valve linkage to cause sleeve 32 to extend into combustion chamber 20 so that its head 36 is approximately at the center of the combustion chamber volume at the beginning of the exhaust stroke. Cam 86 then acts through its associated linkage to pivot rocker arm 114 about pin 112 and cause spring 78 to be compressed, thereby disengaging valve head 72 from its seat 74 and opening the exhaust port 76 to combustion chamber 20. The exhaust gases then pass through port 76, passage 38 and port 42 into exhaust passage 22. It is noted that port 42 is so positioned as to interconnect passage 38 and 22 when sleeve 32 is extending into the combustion chamber. As piston 16 moves toward the cylinder head inner wall 28 the combustion chamber volume is being decreased and the exhaust gases are being pushed out of the chamber. In order to prevent interference with piston 16, sleeve cam 88 is so profiled as to retract the sleeve head 36 to keep it approximately at the center of the combustion volume during most of the exhaust cycle. Accordingly, exhaust valve cam 86 has a profile so as to maintain opening 76 substantially at the center of the combustion chamber volume and permit the continuous exhausst of gases from chamber 20. Cam 86 is also preferably profiled so as to seat valve head 72 against valve seat 74 before the sleeve head 36 is seated against its seat 34. In this manner the exhaust gases from the chamber 20 which have been exhausted are taken from the volume center of the chamber rather than from the chamber walls so that a minimum amount of unburned fuel existing in the quench zone may be exhausted. The combustion chamber therefore retains the unburned or partially burned fuel in the quench zone and that fuel is mixed with the incoming charge for the next cycle. It is then compressed with the incoming charge and may be burned with it when ignited.

A method of engine operation has been disclosed and a mechanism for practicing the method has been illustrated and described. It is recognized that other mechanisms may be utilized in practicing the method. Structures utilizing the invention will prevent the exhaust of most of the unburned hydrocarbons remaining in engine combustion chambers while effectively exhausting the completed products of combustion. The unburned hydrocarbons are made available in the combustion chamber at the next ignition time.

What is claimed is:

1. In an internal combustion engine, a cylinder and a piston reciprocably received in said cylinder and cooperating therewith to define walls of a combustion chamber, a reciprocable exhaust valve for said combustion chamber extendable into said combustion chamber to exhaust gases therefrom, a reciprocable exhaust valve seat receiving said valve thereon when said valve is closed, first means for reciprocating said exhaust valve to open and close it in timed relation with said engine and second means for reciprocating said exhaust valve seat in timed relation with said engine, said exhaust valve being reciprocal with said exhaust valve seat during the power stroke of said piston and being reciprocal relative thereto during the exhaust cycle but closing on said seat prior to completion of the exhaust cycle.

2. An engine exhaust valve and valve seat assembly comprising, a reciprocable sleeve adapted to have one end extend into an engine combustion chamber at the beginning of the engine exhaust cycle and having an exhaust valve seat formed on said end, an engine exhaust valve mounted in said sleeve and reciprocable therewith and further reciprocable relative thereto to open and close relative to said exhaust valve seat during the engine exhaust cycle, and engine valve linkage means for respectively reciprocating said sleeve and said exhaust valve in timed relation with the engine exhaust cycle so that closing of the exhaust valve is timed to occur just prior to the end of the exhaust cycle.

3. An engine exhaust valve system comprising a movable exhaust valve seat, a movable exhaust valve engageable with said seat to close an exhaust port and disengageable with said seat to open the exhaust port, and linkages for actuating said valve seat and said exhaust valve to extend said valve seat and said valve into an engine combustion chamber while in engaged relation and disengage said valve from said valve seat by the beginning of the exhaust cycle and retract said valve seat and said valve during the exhaust cycle, said valve seat being retracted at such a rate as to remain at the instantaneous center of combustion chamber volume.

4. In an engine exhaust valve control assembly, said assembly having a movable exhaust valve seat and a movable exhaust valve movable with said seat and relative to said seat, a camshaft having a valve seat controlling cam and an exhaust valve controlling cam, valve lifters respectively engaging said cams and push rods respectively actuated by said cams through said lifters, a valve seat rocker arm actuated by one of said push rods and operatively engaging said valve seat, and an exhaust valve rocker arm actuated by another of said push rods and operatively engaging said exhaust valve, said valve rocker arm being pivotally attached to pivot on said valve seat rocker arm, said valve seat rocker arm arranged to pivot about a laterally separated axis parallel to the pivot axis of said exhaust valve rocker arm so that said exhaust valve rocker arm also pivots at its push rod contact point when said exhaust valve is movable with said seat.

5. In an internal combustion engine having a combustion chamber and a cylinder head and an exhaust passage formed in said cylinder head and intermittently connected with said combustion chamber, a sleeve reciprocably mounted in said head and intersecting said exhaust passage and having one end connecting with said combustion chamber and defining a reentrant exhaust port, an exhaust valve reciprocably mounted in said sleeve for opening and closing said reentrant exhaust port, an exhaust outlet formed in one wall of said sleeve and connecting with said reentrant exhaust outlet, means for reciprocating said sleeve intermittently in timed relation with the operation of said engine to cause said exhaust port to extend into said combustion chamber during the exhaust cycle of said engine and to align said exhaust outlet with said exhaust passage with said head and means for reciprocating said exhaust valve relative to said sleeve while said sleeve is extended into said combustion chamber to open and close said reentrant exhaust port.

6. A method of withdrawing exhaust gases from an internal combustion engine combustion chamber and leaving unburned hydrocarbons collecting adjacent the combustion chamber walls in the combustion chamber, comprising the step of withdrawing exhaust gas products of combustion from the combustion chamber at substantially the instantaneous center of combustion chamber volume during the engine exhaust stroke.

7. A method of controlling unburned hydrocarbon emission from an internal combustion engine operating on the Otto cycle, said method comprising the steps of inserting a closed exhaust valve and valve seat assembly into an engine combustion chamber before the engine exhaust stroke to a position substantially at the center of combustion chamber volume, opening the exhaust valve relative to the valve seat substantially at the beginning of the exhaust stroke, withdrawing the opened valve and valve seat assembly in direct relation to combustion chamber volume decrease during the exhaust stroke, and closing the valve against the valve seat before the valve and valve seat assembly is withdrawn to a wall of the combustion chamber, whereby unburned hydrocarbons adjacent the combustion chamber walls are retained in the combustion chamber and the exhaust gases exhausted through the open valve and valve seat assembly substantially contain only products of combustion.

8. A method of operating an Otto cycle internal combustion engine comprising the steps of inserting an extendable exhaust valve and valve seat assembly into the engine combustion chamber to a position such that the exhaust port between the valve and valve seat is positioned substantially at the center of volume of the combustion chamber at the beginning of the engine exhaust stroke, opening the valve relative to the valve seat to open the exhaust port, exhausting gases from the combustion chamber through the opened exhaust port during the engine exhaust stroke and simultaneously maintaining the exhaust port substantially at the center of combustion chamber volume as that volume decreases during the exhaust stroke.

9. In an engine exhaust valve control assembly, said assembly having a movable exhaust valve seat and a movable exhaust valve movable with said seat and relative to said seat, a cam shaft having a valve seat controlling cam and an exhaust valve controlling cam, valve lifters respectively engaging said cams and push rods respectively actuated by said cams through said lifters, a valve seat rocker arm pivotally actuated by one of said push rods and operatively engaging said valve seat, and an exhaust valve rocker arm actuated by another of said push rods and operatively engageable with said exhaust valve, said exhaust valve rocker arm being pivotally attached to pivot on said valve seat rocker arm and pivotally engaging its associated push rod at a contact point on the pivot axis of said valve seat rocker arm whereby pivoting movement of said valve seat rocker arm about the pivot axis thereof also pivots said exhaust rocker arm about the valve seat rocker arm pivot axis.

10. In an internal combustion engine, a cylinder and a piston reciprocally received in said cylinder, a head cooperating therewith to define a combustion chamber, an annular seat formed in said head, a sleeve having an exhaust valve seat formed at one end reciprocally received in said head and aligned with said annular seat and being engageable therewith, an exhaust valve reciprocally received in said sleeve and extendable into said combustion chamber to exhaust gases therefrom, said valve having a head adapted to seat on said exhaust valve seat when said valve is closed, a first means for reciprocating said exhaust valve to open and close it in timed relation with said engine and a second means for reciprocating said sleeve in timed relation with said engine, said exhaust valve being closed and movable with said sleeve during the power stroke of said piston and being open and movable relative thereto during the exhaust cycle of said engine but closing on said exhaust valve seat prior to completion of said exhaust cycle whereby said sleeve cooperates with said valve to trap unburned hydrocarbons in said cylinder.

11. The device as described in claim 10 wherein said exhaust valve closes on said exhaust valve seat before said sleeve becomes engaged with said annular seat.

12. The device as described in claim 10 wherein said sleeve and valve are reciprocable along the axis of said cylinder.

References Cited in the file of this patent

UNITED STATES PATENTS

| | | |
|---|---|---|
| 1,965,466 | Moore | July 3, 1934 |
| 2,303,324 | Brumby | Dec. 1, 1942 |
| 2,713,855 | Witzky | July 26, 1955 |
| 2,720,873 | Pick | Oct. 18, 1955 |
| 2,840,059 | Buchi | June 24, 1958 |